April 10, 1928.  1,665,840
D. N. BOOTH
VEHICLE TIRE
Filed July 12, 1927  3 Sheets-Sheet 1
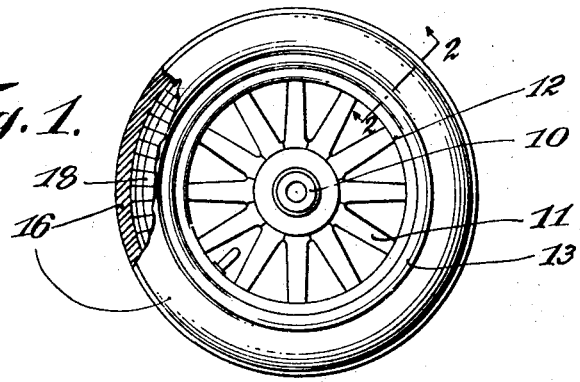
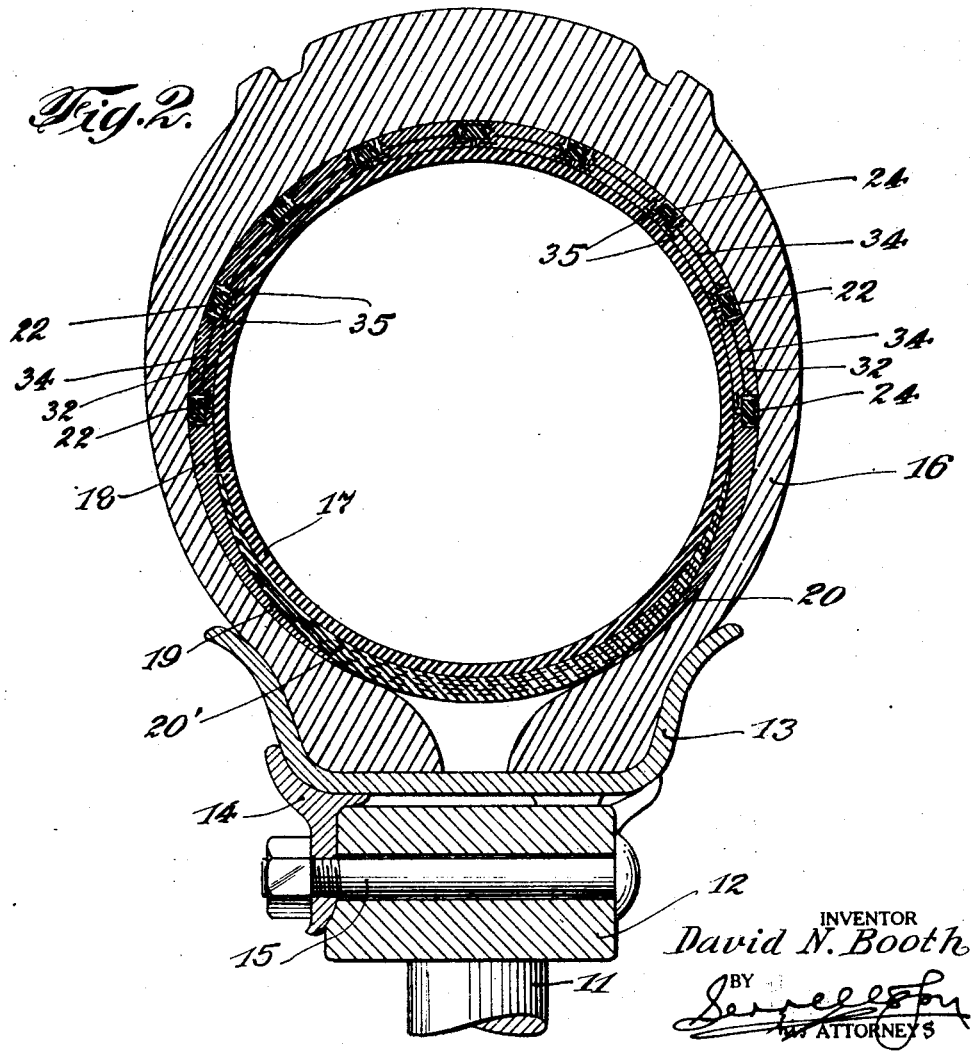
INVENTOR
David N. Booth April 10, 1928.
D. N. BOOTH
VEHICLE TIRE
Filed July 12, 1927     3 Sheets-Sheet 2
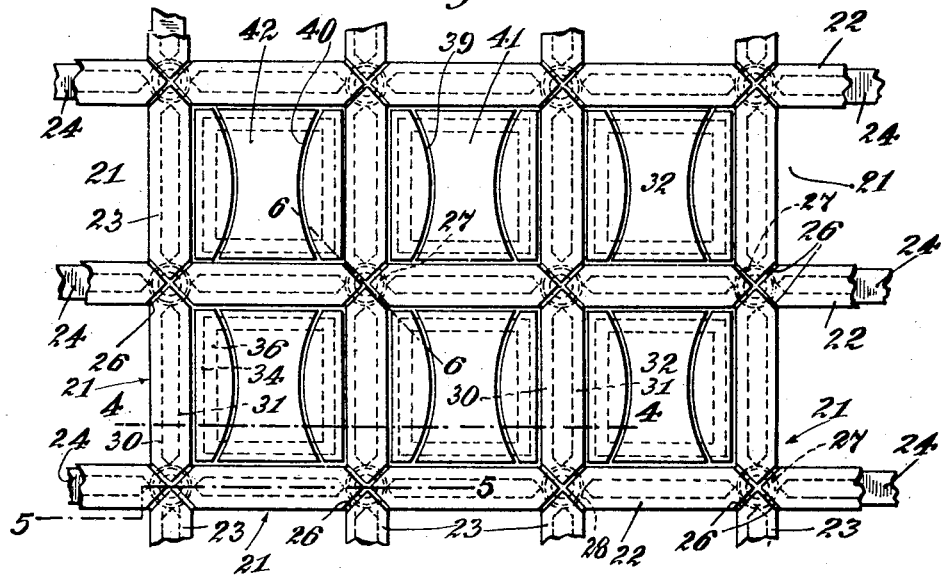
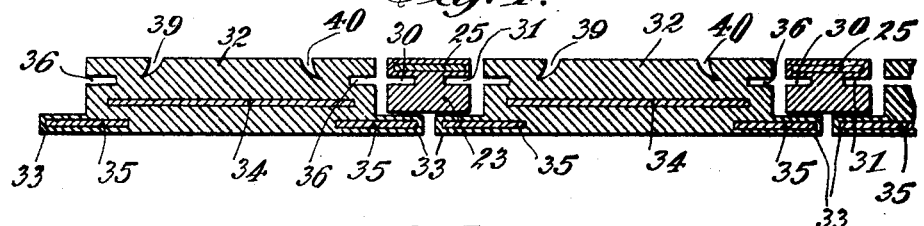
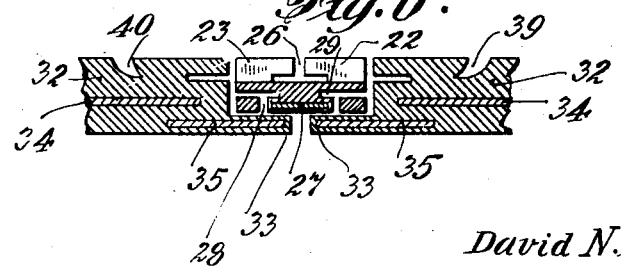
INVENTOR
David N. Booth
BY
ATTORNEYS

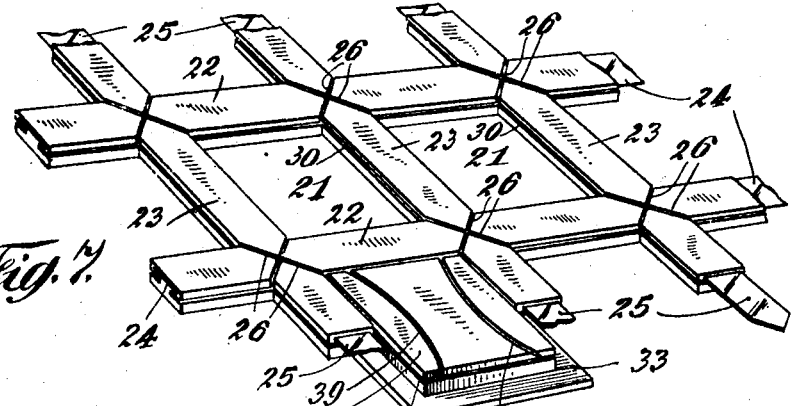
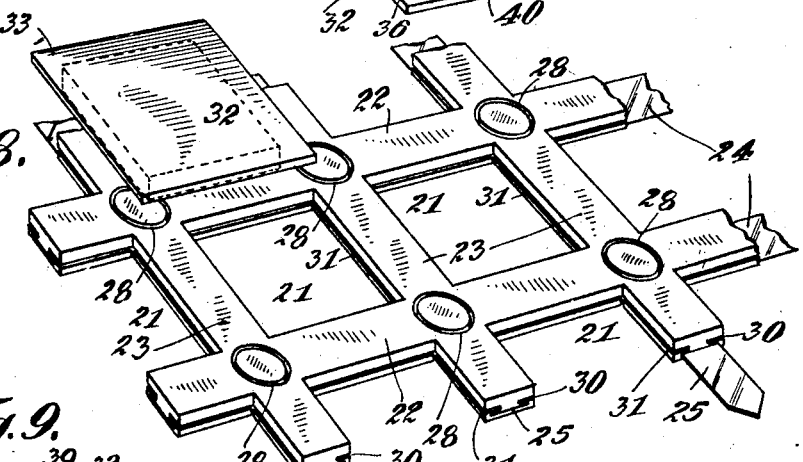
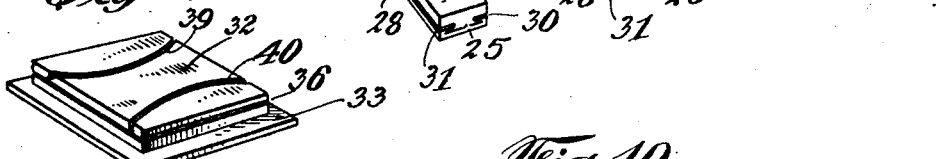
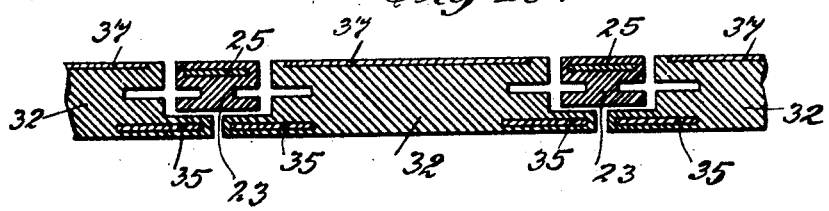
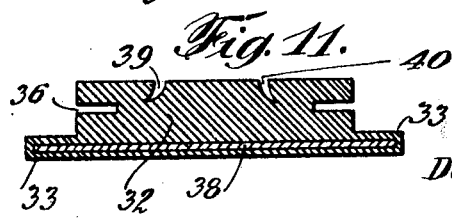

Patented Apr. 10, 1928.

1,665,840

UNITED STATES PATENT OFFICE.

DAVID N. BOOTH, OF NEW YORK, N. Y.

VEHICLE TIRE.

Application filed July 12, 1927. Serial No. 205,061.

This invention relates to an improvement in vehicle tires and particularly to that type of resilient tires commonly employed in trucks, pleasure vehicles, as well as any other type of vehicle with which resilient tires may be advantageously employed. The object of the invention is the provision of an armor for making the tire substantially puncture-proof, in order as will be understood to obviate the difficulties and inconveniences incident to repairing tires on the road. The armor made in accordance with this invention is furthermore of the type which is adapted to fit and lie within the shoe and between the inner surface of the same and the inner tube. I am aware that heretofore various devices have been proposed for similar purposes and for use in the same location in the tire. So far as I am aware, however, all such devices have been more or less theoretical and not adapted for practical purposes, due largely to the unyielding nature or character of the material of which they have been constructed. It is believed to be readily apparent that to be satisfactorily operative a tire armor of the type to which reference has been made and to which this invention particularly relates must be yielding and resilient to substantially the same extent as the shoe of the tire with which the armor is employed, and it is the purpose of the present invention to provide such an armor.

To this end in carrying out the invention the vehicle tire armor made in accordance therewith preferably comprises a band of suitably yielding and preferably resilient material, together with a plurality of spaced inserts placed in apertures provided for this purpose in the band, the said inserts or blocks also being of yielding and preferably resilient material. In carrying out the invention the apertures in the band for reception of the inserts are preferably so placed as to cause the band to assume a form in which there are both longitudinally and transversely disposed strips all of which are suitably reinforced by including plates of metal or other similar material so as to make the same non-puncturable, and in like manner the inserts are similarly provided with reinforcing plates of metal or other non-puncturable material and the reinforcing plates may be molded or vulcanized into the material of which the armor is made, or otherwise secured therein in such positions that these plates overlap each other to form a substantially continuous non-puncturable surface which is coextensive with the tread of the tire and to any desired degree with the sides of the tire, that is with the shoe, and as hereinafter described the parts of the armor are otherwise constructed so that the metal plates do not interfere materially with its yielding and resilient qualities in order to permit it to conform at all times to the shape of the shoe while the tire is in use.

In carrying out the invention the band member of the armor is a unitary flexible structure and also each insert or block is a separate unitary flexible structure, these parts being associated by placing each insert or block in an opening made therefor in the band, the relationship being such that each block is permitted to move freely in each opening in the band. Furthermore each insert or block is flanged and the inserts or blocks are placed in the opening from the inside of the band so that due to the flanges the inserts or blocks can not pass through the openings from the inside of the band outwardly and when the armor is in place due to the pressure of the inner tube the inserts or blocks are prevented from falling out of position in the openings of the band as will be hereinafter more particularly described.

In the drawing Figure 1 is an elevation and partial section illustrating a vehicle wheel in which my present invention is incorporated.

Fig. 2 is an enlarged transverse section illustrating the invention.

Fig. 3 is a partial plan illustrating the armor construction.

Fig. 4 is an enlarged section on line 4—4, Fig. 3.

Fig. 5 is an enlarged section on line 5—5, Fig. 3.

Fig. 6 is also an enlarged section on line 6—6, Fig. 3.

Fig. 7 is a perspective view illustrating a portion of the armor showing the outer or obverse side thereof.

Fig. 8 is a similar view showing the inner or reverse side of the armor.

Fig. 9 is a perspective view illustrating one of the inserts or blocks forming a part of the armor band.

Fig. 10 is a section illustrating a modification of the invention, and

Fig. 11 is a transverse section of one of the inserts or blocks also showing a modified form thereof.

By reference to the drawing it will be seen that in carrying out the invention the tire armor is applicable to the usual type of pneumatic tire as used in all type of motor as well possibly as other vehicles. As illustrated, the hub of a vehicle wheel is designated at 10, the spokes of the wheel are illustrated at 11. The wheel includes a fixed rim 12 secured to the spokes in the usual manner. Associated with the wheel there is the customary demountable rim 13 secured to the rim of the wheel by clamps 14 and bolts 15 or otherwise. The demountable rim 13 is adapted to receive the shoe 16 of the tire and the shoe to contain the inner tube 17 which may be inflated, and the compressed air held therein in any of the ways well known in the art.

My present invention relates more particularly to the construction of a band of armor to be employed between the shoe and the inner tube. The band to which the invention relates is designated by 18. This band is made of yielding and resilient material such for example as a suitable rubber, although the invention is not restricted to the use of rubber, as other suitable material may be employed. This band 18 is formed to fit within the shoe of the tire and to lie against the inner surface thereof and to receive the inner tube. The oppositely disposed edges of the band are preferably tapered as indicated at 19 and 20 so as to make provision for the filler member 20′ used at the edges of the shoe to cover and protect the inner tube, and as shown, the edges of this filler member may also be tapered and the filler of such an extent, that is width, as to extend appreciable distances beyond the edges of the band of the armor. This feature is clearly illustrated in Figure 2 of the drawing.

The band of the armor is provided with a plurality of suitably placed and shaped openings indicated at 21. These openings 21, as illustrated, are rectangular and preferably square, although as will be understood, they are not necessarily limited to this specific form. It will be understood that any desired portion of the band may be provided with the openings 21, and in any event, it is necessary to provide that portion of the band which constitutes the tread or is substantially coextesive with the tread of the shoe with these openings, and furthermore, any desired portion of the band extending any required distance over the sides of the shoe may also be provided with these openings. With the openings in the form described, and as illustrated in the drawing, those portions of the band in which the openings are provided assume longitudinally and transversely disposed strips of the resilient material of which the band is formed. The longitudinal strips are indicated at 22 and the transverse strips at 23. Of course, these longitudinal transverse strips cross each other at predetermined junction points. The sections of each longitudinal strip between the junction points with the transverse strips are fitted with reinforcing plates 24 which may be made of sheet metal or any other suitable and substantially non-puncturable material. In a similar manner the sections of the transversely disposed strips of the armor band extending between the junction points with the longitudinally disposed strips are also each fitted with a reinforcing plate 25 made of sheet metal or other similar material. These reinforcing plates 24 and 25 may be molded or vulcanized into the material and are of a predetermined width and also of a predetermined length, each of these plates being preferably beveled or tapered at the oppositely disposed extremities thereof, as is clearly illustrated in Figures 3 and 8 of the drawing. In order to make the several sections forming the strips of the band more flexible at the junction points of the band, these junction points are provided with diagonally disposed grooves as indicated at 26. These grooves are preferably placed in the outer or obverse face of the band. In order to protect the junction points of the strips of the band, each junction point is preferably fitted with a reinforcing plate 27 of metal or other similar material in the form of a disk. It will be understood that the reinforcing plates 24 and 25 are sufficiently long to extend over, that is to overlap the reinforcing disks 27. This is clearly illustrated in Figure 5 of the drawing. Also as illustrated, and in order to make the junction points of the strip forming the armor band more flexible, the same are provided with circular recesses 28 surrounding the metal disks and undercut as indicated at 29. For a like purpose each section of the longitudinally and transversely disposed strips of the armor band is preferably fitted with oppositely disposed grooves as indicated at 30 and 31 which extend the entire length of each face defining each opening.

Associated with the band as hereinbefore described, I employ a plurality of inserts or blocks each adapted to be received and to fit within one of the holes or openings in the band. In one construction a block is illustrated in Fig. 9 of the drawing. The body of the block is designated at 32. The block is flanged as indicated at 33, and as will be understood, the block is preferably made of rubber or other equally pliable and resilient material, and preferably of the same material of which the band member of the armor is constructed. As illustrated in Figures 3, 4 and 9 for example, each block is provided with a reinforcing plate 34 made of sheet metal or other similar material and also with reinforcing plates 35. The reinforcing plate 34 as illustrated in these figures is embedded in the body of the block, while the reinforcing plates 35 are embedded in the flanged portion of the block. The width of the reinforcing plates 35 is sufficient to overlap the peripheral portions of the reinforcing plate 34. It will be understood that the body of the block is adapted to fit within a recess or opening in the band, and furthermore, as illustrated, in such a manner as to be slightly spaced therefrom so as to increase the flexibility of the armor and to permit of the free play or movement of each block within its recess, permitting a slight shifting movement circumferentially of the tire and also as much of a radial movement as may be necessary, depending of course, upon the configuration of the shoe to which the armor is constructed to conform. It will be noted that the plates 35 are adapted to overlap the plates 24 and 25, and furthermore, that the plates 35 also overlap the disk plates 27. The arrangement of these plates, as illustrated for example in Figures 3 to 6 of the drawing, is merely illustrative, as other and similar arrangements in which the plates overlap to form a substantially continuous protective surface may be varied without departing from the nature of the invention. Furthermore, in order to make the inserts or blocks more resilient the same are preferably constructed in such a manner that the sides of the body portions thereof are formed with grooves indicated at 36. These grooves 36 in the bodies of the blocks are preferably so placed as to be juxtaposed to the grooves 30 and 31 in the sections of the circumferentially and transversely disposed strips of the band of the armor. It is furthermore to be noted that the flanges of the blocks are of such dimensions that when the blocks are in position the flanges are slightly spaced so as to permit of the lateral shifting of the blocks, as hereinbefore described.

In the preferred form of the invention the reinforcing plates as hereinbefore described are preferably molded or vulcanized in the rubber or other similar material of which the parts of the armor are made. However, instead of embedding the reinforcing plates in the rubber or other material, for example a reinforcing plate 37 may be merely inserted in a recess provided therefor in the outer face of each block as indicated in Figure 10 of the drawing. Still furthermore, as indicated in Fig. 11, a reinforcing plate 38 may be embedded in the block so as to combine the reinforcing plates 34 and 35 as illustrated in the preferred form of the invention. These, however, are merely illustrative of the manner in which the forms of the reinforcing plates may be varied without departing from the nature of the invention. Still furthermore, the outer face of each block may be provided with grooves or notches indicated at 39 and 40, preferably formed on oppositely disposed arcs and adapted to receive a rubber band or string or similar device to temporarily maintain the blocks in position relatively to the band, for example the groove 39 of the block 41 may be connected with the groove 40 of the block 42, as illustrated in Fig. 3, the connecting means as will be understood extend over the intermediate section of the transversely disposed strip of the band to secure these blocks in place in the band, similar connections being made when necessary between each adjacent set of blocks extending circumferentially of the band, although as will be understood this is merely because of the manner in which the blocks are illustrated as shown in Fig. 3, because if the blocks were inserted in positions at right angles to those illustrated, the connecting means would necessarily extend transversely of the band. It will be understood, of course, that these connecting devices are preferably resilient and may be retained at all times in the armor after the same is placed in position without materially affecting the functions thereof.

Frm the foregoing description it will now be understood that the tire armor made in accordance with my invention comprises a band of flexible and preferably resilient material constructed to form a net to lie within the shoe of a tire and between the same and its inner tube conforming to both the shoe and the tube, together with a plurality of inserts or blocks adapted to be inserted in the openings or apertures in the net, the net portion of the band being provided with reinforcing plates as is also each of the inserts or blocks in such a manner that the reinforcing plates in the net portion of the band lie in different planes to the reinforcing plates in the inserts or blocks so that by the yielding and flexible and resilient material intervening between overlapping portions of the reinforcing plates, together with the grooves which are provided in the faces of the sections of the net portion of the band and the edge portions of the blocks or inserts the movement of any particular reinforcing plate is not materially affected by the movement of any other reinforcing plate. It will furthermore be understood that there is a relative movement between each insert or block and the net portion of the band, which latter maintains the blocks in position when in place between the shoe and the inner tube, but at the same time permits a slight lateral movement of the blocks relatively to the net part of the band and also permits the blocks to move independently of each other to any desired extent radially, that is toward and away from the hub of the wheel in order to cause the armor to conform to the shoe and its inner tube under working conditions of the tire. It will also be obvious that the size of the band is made to correspond with the size of the shoe and tube with which it is to be employed, and that the superficial area of each block or insert may be of such dimensions as to vary with different sized shoes in order to cause the armor to perform its intended functions to the best advantage.

I claim as my invention:

1. In a vehicle tire, an armor comprising a band of flexible material having a plurality of openings therein, a plurality of blocks each placed in an opening in the band so that the blocks are movable in the band and the parts are adapted to conform to the shoe of a tire under working conditions thereof, and reinforcing plates in overlapping relationship in the said band and blocks.

2. In a vehicle tire, an armor comprising a band of flexible material adapted to fit between a shoe and an inner tube and having a plurality of openings therein, reinforcing plates in the said band, a plurality of blocks, each placed and adapted to move freely in an opening in the said band, and a reinforcing plate in each of the said blocks, whereby the band and the blocks conform to the shoe under working conditions thereof.

3. In a vehicle tire, an armor comprising a band of flexible resilient material adapted to lie between a shoe and an inner tube of a tire and having a plurality of openings in a portion thereof, a plurality of blocks each received in an opening in the said band, and a reinforcing plate in each of the said blocks, whereby the band and blocks conform to the shoe under working conditions and the blocks may move radially independently of each other.

4. In a vehicle tire, an armor comprising a band of flexible resilient material adapted to lie between a shoe and its inner tube and having a plurality of openings in the tread and side portions thereof, a plurality of blocks each placed and adapted to move in an opening in the said band, and reinforcing plates placed in overlapping relationships in the apertured portion of the band and the said blocks.

5. In a vehicle tire, an armor comprising a band of flexible resilient material adapted to lie between the shoe and its inner tube and having a plurality of rectangular openings in the tread and side portions thereof, reinforcing plates embedded in that portion of the band in which the said openings are made, a plurality of blocks each having a rectangular body received in an opening in the band and a flange of larger area than the opening in the band, and a reinforcing plate embedded in each of the said blocks, whereby the said band and blocks conform to the shoe and tube under working conditions and the blocks are held in position laterally by the band but permitted to move radially to an extent dependent upon the form of the shoe and inner tube.

6. In a vehicle tire, an armor comprising a band of flexible resilient material adapted to lie between a shoe and its inner tube and having a plurality of rectangular openings in the tread and side portions thereof, the said openings being arranged both circumferentially and transversely of the band to provide intersecting strips extending around the band and crosswise thereof, a reinforcing plate in each section of the strips of the said band, a reinforcing plate at the junction of each of the sections of the said band, a plurality of blocks, each block having a rectangular body received in an opening in the said band and a flange of greater superficial area than the said opening, and a reinforcing plate in each of the said blocks, the said reinforcing plates in the blocks and band lying in different planes and adapted to overlap each other.

7. In a vehicle tire, an armor comprising a band of flexible resilient material adapted to lie between a shoe and its inner tube and having a plurality of rectangular openings in the tread and side portions thereof, the said openings being so placed as to form strips extending circumferentially of the band and also transversely thereof, a reinforcing plate embedded in each section of the said strips, a circular reinforcing plate embedded at the junction of each of the said sections of the strips, there being grooves in the walls defining the said openings and also grooves in the junctions between the sections of the said strips, a plurality of blocks each having a rectangular body portion received in one of the openings in the said band and a flange of greater superficial area than the said opening, and a reinforcing plate embedded in each of the said blocks, the edges of the blocks being provided with grooves, the said reinforcing plates in the blocks and in the strips of the band being placed in different planes and made of such an extent as to overlap each other.

Signed by me this 2nd day of July, 1927.

DAVID N. BOOTH.